(12) United States Patent
Aoyagi et al.

(10) Patent No.: US 7,513,030 B2
(45) Date of Patent: Apr. 7, 2009

(54) METHOD OF ASSEMBLING AN ACTUATOR ARM SYSTEM FOR A HARD DISK

(75) Inventors: Akihiko Aoyagi, Fujisawa (JP); Fu-Ying Huang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 375 days.

(21) Appl. No.: 10/753,259

(22) Filed: Jan. 7, 2004

(65) Prior Publication Data

US 2005/0146809 A1 Jul. 7, 2005

(51) Int. Cl.
*G11B 5/48* (2006.01)
*B21D 53/10* (2006.01)

(52) U.S. Cl. .............. 29/603.03; 29/898; 29/898.09; 360/265.2; 360/271.1

(58) Field of Classification Search .............. 29/603.03, 29/596, 898, 898.09, 898.04; 360/98.06, 360/265.2, 265.3, 265.6, 99.08, 99.12, 265.1, 360/265.5, 271.1, 98.07, 99.04; 310/90
See application file for complete search history.

(56) References Cited

U.S. PATENT DOCUMENTS

| | | | |
|---|---|---|---|
| 4,900,958 A * | 2/1990 | Kitahara et al. ....... 360/98.06 X |
| 5,482,381 A * | 1/1996 | Krum et al. ............ 360/265.3 X |
| 5,539,597 A * | 7/1996 | Blanks ...................... 360/265.6 |
| 5,949,165 A * | 9/1999 | Sakuragi .................... 310/90 X |
| 6,178,618 B1 | 1/2001 | Heim et al. ............... 29/603.03 |
| 6,411,471 B1 | 6/2002 | Liu et al. .................. 360/265.2 |
| 6,487,053 B1 | 11/2002 | Matsumura et al. ...... 360/265.7 |
| 6,545,845 B2 | 4/2003 | Dague et al. .............. 360/265.6 |
| 6,603,640 B1 | 8/2003 | Prater et al. .............. 360/265.6 |
| 6,744,605 B2 * | 6/2004 | Lindrose ................... 360/265.2 |
| 6,761,485 B2 * | 7/2004 | Muraki et al. .......... 360/99.08 X |

FOREIGN PATENT DOCUMENTS

JP 9-293323 * 11/1997

* cited by examiner

*Primary Examiner*—A. Dexter Tugbang

(57) ABSTRACT

One embodiment of the invention can include a method of assembling an actuator arm system for a hard disk drive. The method can include: placing a lower bearing on a shaft; placing an actuator arm on the lower bearing; placing an upper bearing on the shaft; applying an adhesive between an inner race of the upper bearing and the shaft; applying an axial preload force to the inner race of the upper bearing; curing the adhesive; and releasing the preload force.

9 Claims, 5 Drawing Sheets

METHOD OF ASSEMBLING AN ACTUATOR ARM SYSTEM FOR A HARD DISK

FIELD

The invention relates to hard disk drives, and more specifically, actuator arm assemblies for hard disk drives.

BACKGROUND

Hard disk drives are used in computers and other electronic devices for nonvolatile memory. A hard disk drive allows fast random access reading and writing of data to nonvolatile memory at a reasonable cost.

A hard disk drive usually consists of one or more platters coated with a magnetic material that can be polarized in order to store bits of information. A magnetic read/write head, which is attached to an actuator arm, reads and writes information to the disk surface. To access different tracks on the disk surface, the actuator arm pivots to change the radial location of the head relative to the center of the disk. A voice coil motor is commonly used to control the movement of the actuator arm.

Actuator arm assemblies commonly use pivot cartridge assemblies to allow the actuator arm to pivot relative to the hard drive disk. A pivot cartridge usually consists of a sleeve, usually made of stainless steel, two or more bearings, and a shaft.

FIG. 1 shows a prior art pivot cartridge 10 and actuator arm 12. The actuator arm 12 holds the voice coil 14, which is used for controlling movement. The actuator arm 12 may be attached to the pivot cartridge 10 with an adhesive applied to an inner surface 13 of the actuator arm 12, with a mechanical fastener such as a screw 20 threaded into the actuator arm 12 at a threaded hole 22, or with a compression ring (c-ring) 16 and spring washer 18 combination.

FIG. 2 shows a cross section of a typical prior art pivot cartridge 10. In this example the actuator arm 12 and pivot cartridge 10 are assembled with a c-ring 16 and spring washer 18. The pivot cartridge 10 includes a sleeve 30, an upper bearing 26, a lower bearing 24, and a shaft 28. The shaft 28 has a flange 29 that separates the upper bearing 26 and lower bearing 24. The bearings 24, 26 are usually attached to the sleeve 30 with an adhesive. Typically, a preload force (500 g for example) is applied to the pivot cartridge assembly 10 while the adhesive cures. Adhesives are used, because the relatively high preload force cannot be maintained with other methods such as a frictional or interference fit. A suitable adhesive is an ultraviolet light curing adhesive such as Loctite 648UV.

The sleeve of a typical pivot cartridge, which may have a wall thickness of less than 1 mm, is very expensive to manufacture. If the sleeve could be eliminated from the actuator arm pivot assembly, the disk drive manufacturing cost would be significantly reduced. Thus, there is a need for a sleeveless actuator arm pivot assembly.

SUMMARY

An actuator arm pivot assembly is described with a shaft, bearings, and an actuator arm. One embodiment comprises a pivot assembly with a rotating shaft. Another embodiment comprises a pivot assembly with a stationary shaft.

DESCRIPTION

The pivot cartridge sleeve commonly used in actuator arm assemblies is usually made of stainless steel and has a wall thickness of less than 1 mm. The very thin wall renders the sleeve difficult to manufacture, increasing the manufacturing expense and resulting in a high part cost. Designing the assembly without a sleeve achieves significant cost savings.

Figure 1:
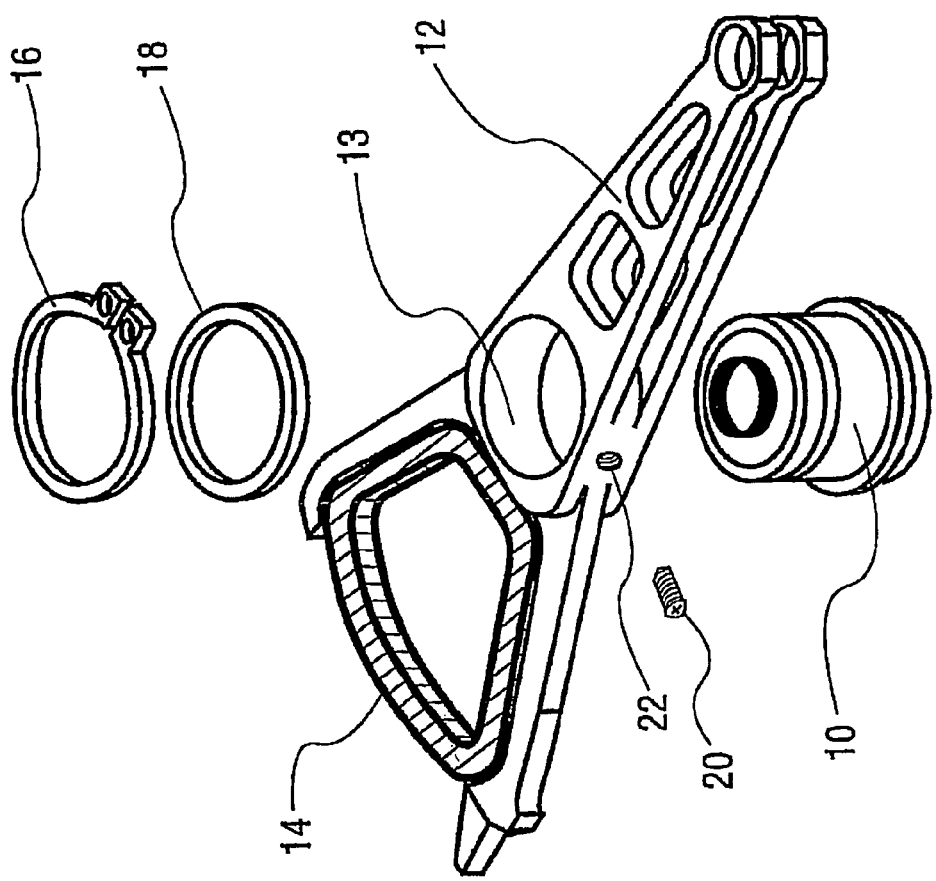
FIG. 1 shows a prior art actuator arm pivot assembly.
Figure 2:
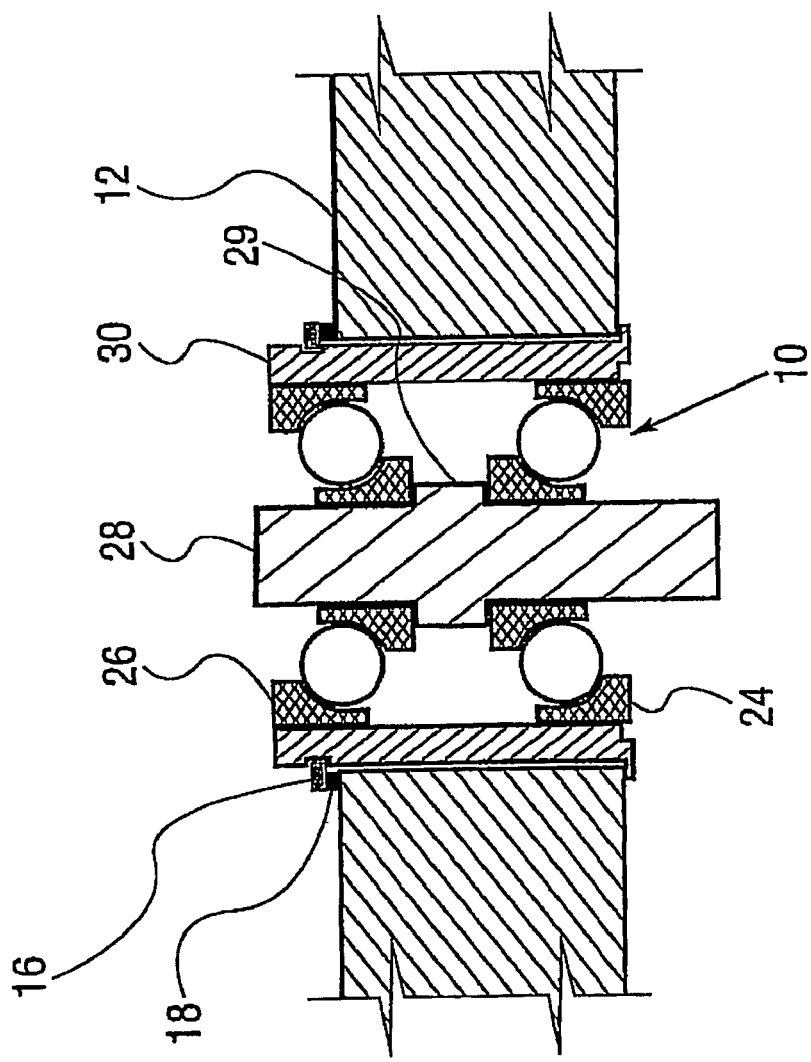
FIG. 2 shows a prior art cross sectional view of a pivot cartridge.
Figure 3:
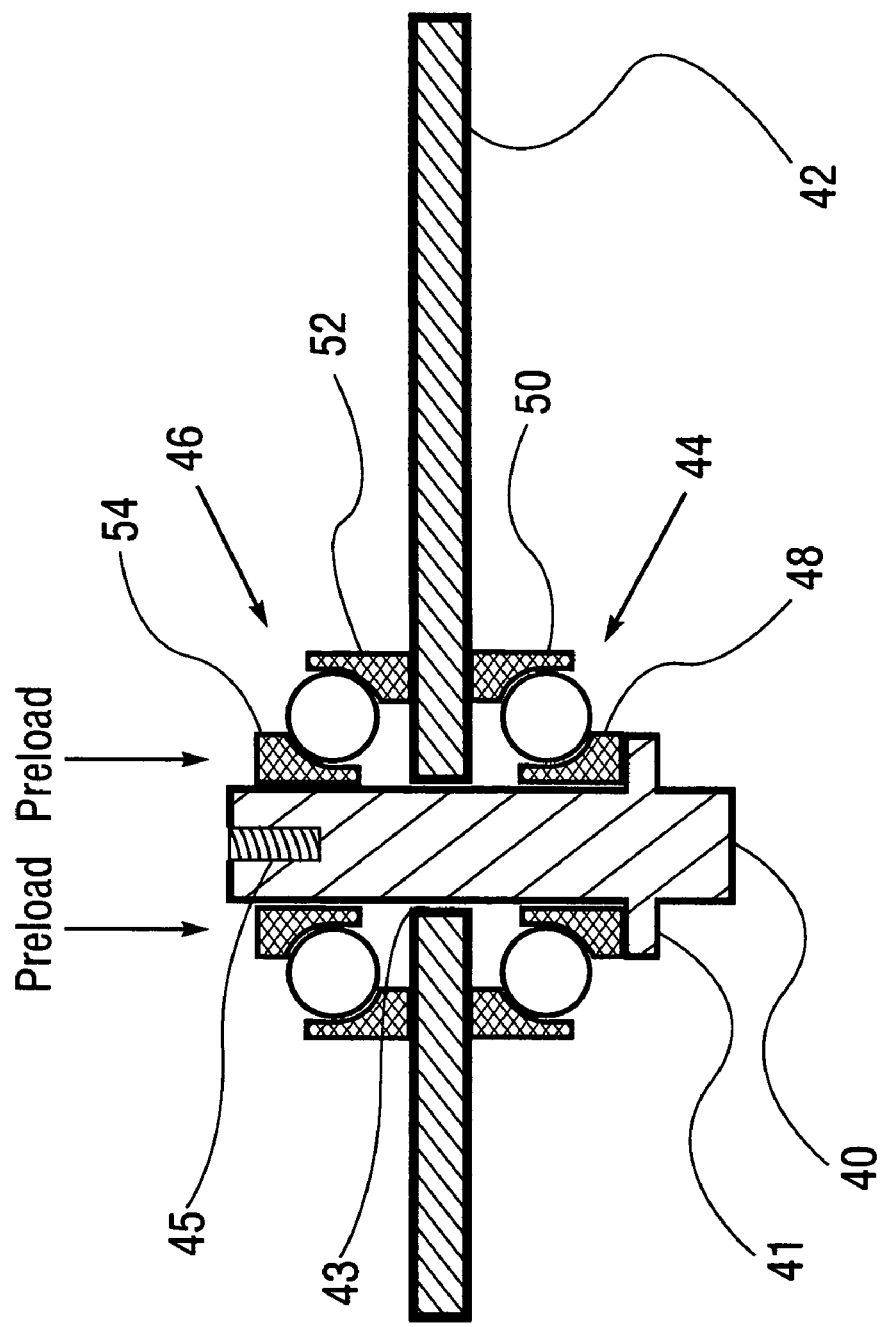
FIG. 3 shows a first example of an actuator arm pivot assembly.

FIG. 3 shows an example of a sleeveless actuator arm pivot assembly. The shaft 40 has a flange 41 that restrains the lower bearing 44. The actuator arm 42 is positioned between the upper bearing 46 and the lower bearing 44. The bearings 44, 46 prevent axial movement of the arm 42. The arm 42 is shaped such that a gap 43 exists between the arm 42 and the shaft 40. The gap 43 allows the arm 42 to freely rotate around the shaft 40 without contact between the arm 42 and the shaft 40.

The assembly shown in FIG. 3 can be assembled by first placing the lower bearing 44 on the shaft 40. Next, the actuator arm 42 is placed on the lower bearing 44. Then the upper bearing 46 is placed on the shaft 40 and in contact with the actuator arm 42. An adhesive is placed between the shaft 40 and the inner race 54 of the upper bearing 46 either before or after the upper bearing 46 is placed on the shaft 40. A preload is applied to the inner race 54 of the upper bearing 46 before the adhesive is cured. The preload securely clamps the actuator arm 42 between the lower and upper bearings 44, 46. The preload also stiffens the assembly. Stiffening the assembly is desirable as it increases the dynamic response of the system and leads to faster track seek times. After the adhesive is cured, the preload is removed. An optional threaded hole 45 in the top of the shaft 40 allows the outside cover of the disk drive or other structural part to be secured to the shaft 40. This may further increase the stiffness of the pivot assembly.

The actuator arm 42 pivot assembly described above uses a stationary shaft 40 with a rotating actuator arm 42. It is also possible to build an actuator arm 42 pivot assembly with a rotating shaft 40.

Figure 4:
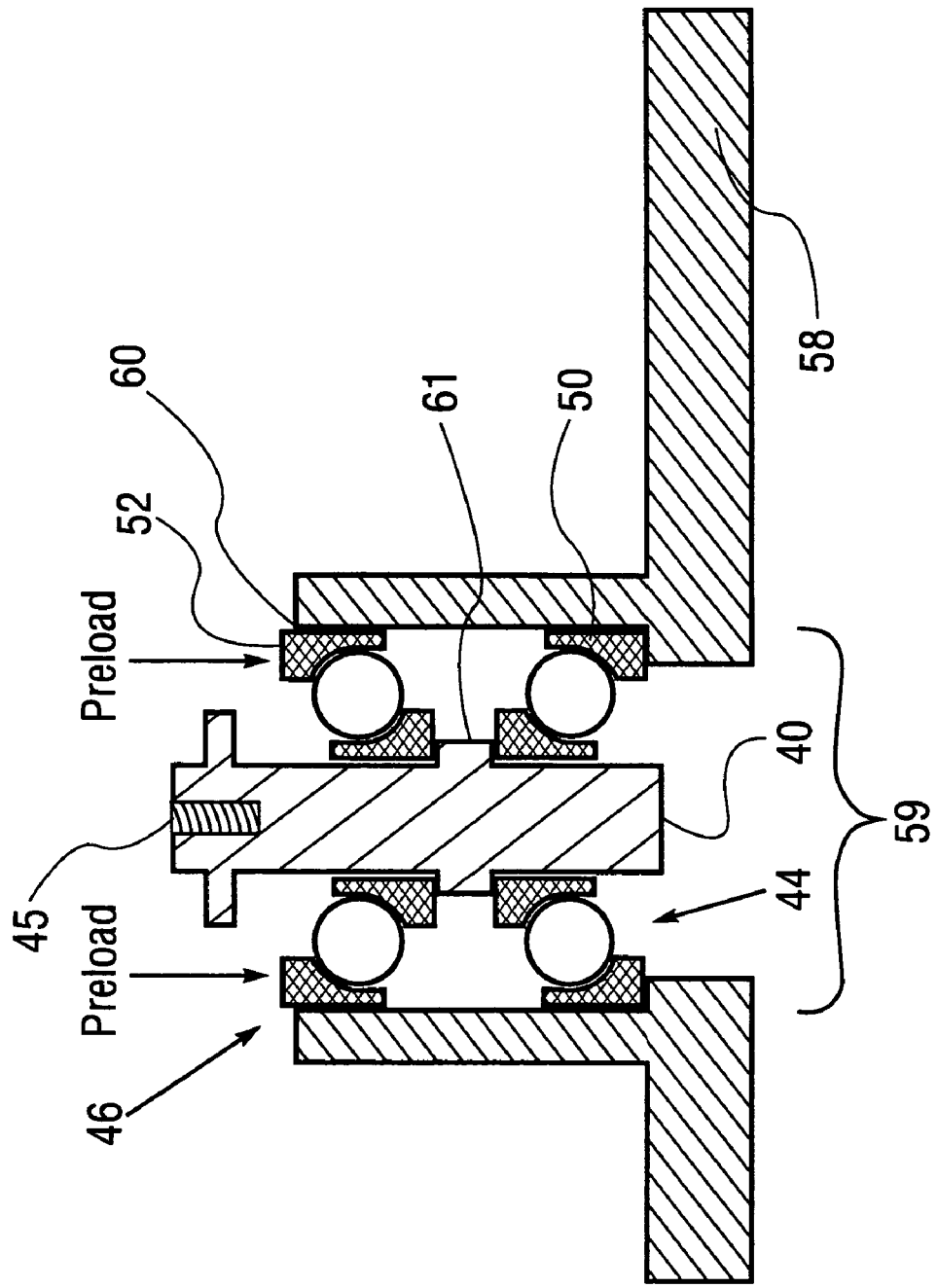
FIG. 4 shows a second example of an actuator arm pivot assembly.

FIG. 4 shows a second example of a sleeveless actuator arm pivot assembly without the actuator arm 42 attached. The base 58 has a hole 59 that can receive lower and upper bearings 44, 46. The frame of the disk drive or other structural member may be used as the base 58. The shaft 40 is held in place by the bearings 44, 46 and is allowed to rotate relative to the base 58. The shaft 40 has a flange 61 that keeps the shaft 40 and bearings 44, 46 from moving in the axial direction. A preload on the outer race 52 of the upper bearing 46 is shown.

The assembly shown in FIG. 4 can be assembled by first placing the lower bearing 44 in the hole 59. Next, the shaft 40 is placed in the bore of the lower bearing 44. Then the upper bearing 46 is placed in the hole 59 and on the shaft 40. An adhesive is applied to the interface 60 between the hole 59 and the outer race 52 of the upper bearing 46 either before or after the upper bearing 46 is placed on the shaft 40. A preload is applied while the adhesive cures. After the adhesive is cured, the preload is removed.

Figure 5:
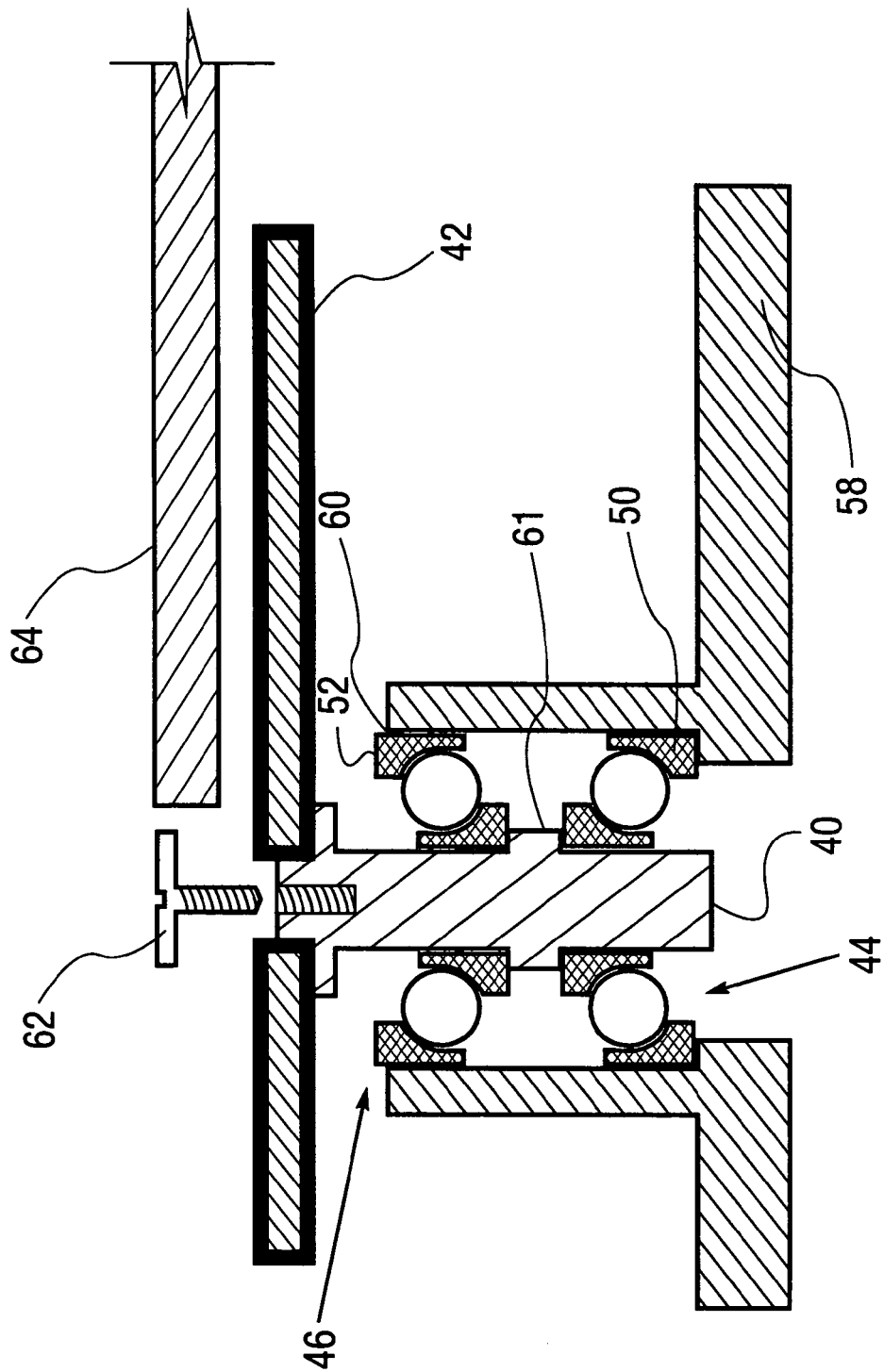
FIG. 5 shows the pivot assembly of FIG. 4 with an attached actuator arm.

FIG. 5 shows the same sleeveless actuator arm 42 pivot assembly of FIG. 4 with the actuator arm 42 attached to the shaft 40. The actuator arm 42 can be attached with an adhesive, a mechanical fastener, or other suitable means. FIG. 5 shows the actuator arm 42 attached with a screw 62. Also shown is the disk 64 of the hard disk drive. In this example, the disk 64 overlaps both the outer race 52 of the upper bearing 46 and the outer race 50 of the lower bearing 44. Overlapping the disk 64 with elements of the pivot assembly leads to a more compact hard disk drive. A more compact hard disk drive is desirable as it requires less space in the end product and allows greater design flexibility.

The embodiments of FIGS. 3 and 5 discussed above can have many variations. For example, it might be desirable to use lower and upper bearings 44, 46 with different outer diameters. Likewise, it might be desirable to use lower and upper bearings 44, 46 with different inner bores. The shaft 40 may have a plurality of flanges or equivalent features to axially place the shaft 40, bearings 44, 46, and/or actuator arm 42. The shaft 40 may also have one or more flanges designed to stabilize the actuator arm 42 against the shaft 40. In addition, the hole 59 in the base 58 shown in FIGS. 4 and 5 may have multiple bore sizes to accommodate different bearing diameters.

It should also be apparent that sleeveless pivot assemblies can be constructed with multiple actuator arms for disk drives with multiple platters. Such an assembly might require more than two bearings and more complex profiles for the shaft 40 and/or the hole 59 in the base 58.

It will be apparent to one skilled in the art that the described embodiments may be altered in many ways without departing from the spirit and scope of the invention. Accordingly, the scope of the invention should be determined by the following claims and their equivalents.

What is claimed is:

1. A method of assembling an actuator arm system for a hard disk drive comprising:

positioning a lower bearing on a flange, the lower bearing having an inner race and an outer race, the flange supports the inner race in an axial direction relative to a shaft and the flange is in direct contact with the inner race, and wherein the lower bearing and an upper bearing are positioned on the same side of the flange;

placing an actuator arm on the outer race of the lower bearing wherein the actuator arm is in contact with the outer race of the lower bearing;

placing the upper bearing on the shaft, the upper bearing having an inner race and an outer race, wherein the outer race of the upper bearing is in contact with the actuator arm, such that the actuator arm is located between the lower bearing and the upper bearing;

applying an adhesive between the inner race of the upper bearing and the shaft;

applying an axial preload force to the inner race of the upper bearing;

curing the adhesive; and releasing the preload force.

2. The method of claim 1, wherein the upper bearing and the lower bearing have equivalent inner bores.

3. The method of claim 1, wherein the upper bearing and the lower bearing have different inner bores.

4. The method of claim 1, wherein the upper bearing and the lower bearing have equivalent outer diameters.

5. The method of claim 1, wherein the upper bearing and the lower bearing have different outer diameters.

6. The method of claim 1, wherein the actuator arm system does not include a sleeve to receive the upper bearing and the lower bearing.

7. The method of claim 1, wherein the shaft includes the flange that restrains the lower bearing.

8. The method of claim 1, wherein the actuator arm is shaped such that a gap exists between the actuator arm and the shaft.

9. The method of claim 1, wherein the shaft comprises a threaded hole in the top of the shaft.

* * * * *